United States Patent [19]

Courty

[11] 4,157,615
[45] Jun. 12, 1979

[54] PIPE CUTTER OF THE RATCHET TYPE

[76] Inventor: Aurèle Courty, 471 St. Madeleine St., Montreal, Quebec, Canada, H3K 2K8

[21] Appl. No.: 869,346

[22] Filed: Jan. 13, 1978

[30] Foreign Application Priority Data

Jan. 17, 1977 [GB] United Kingdom ............... 01670/77

[51] Int. Cl.² .......................................... B23D 21/06
[52] U.S. Cl. ....................................................... 30/99
[58] Field of Search ...................................... 30/99, 98

[56] References Cited

U.S. PATENT DOCUMENTS

| | | | |
|---|---|---|---|
| 882,432 | 3/1908 | Thomas | 30/99 |
| 2,379,177 | 6/1945 | Pavey | 30/99 |
| 2,447,371 | 8/1948 | Sipsma et al. | 30/99 |
| 2,782,500 | 2/1957 | Kelley | 30/99 |
| 3,715,804 | 2/1973 | Kelley | 30/99 |

Primary Examiner—James L. Jones, Jr.
Assistant Examiner—J. T. Zatarga

[57] ABSTRACT

A pipe cutter incorporating a ratchet handle. A tubular open-ended rigid body, adapted to surround the pipe to be cut, carries a cutting wheel and a jaw adjustable towards and away from the cutting wheel. An elongated handle has a ring member at one end rotatable within a peripheral groove of the tubular body. A pawl and ratchet system is arranged between the handle and the body, whereby back-and-forth rotation of the handle through a limited angle will cause step-by-step rotation of the body and cutter in one direction through at least 360°. The body has a lateral opening which registers with the access opening between the jaw and the cutter. The ring of the handle also has a lateral opening which can register with the opening of the body in one angular position of the handle for the insertion of a pipe through the aligned openings in position within the body and between the jaw and the cutter.

5 Claims, 9 Drawing Figures

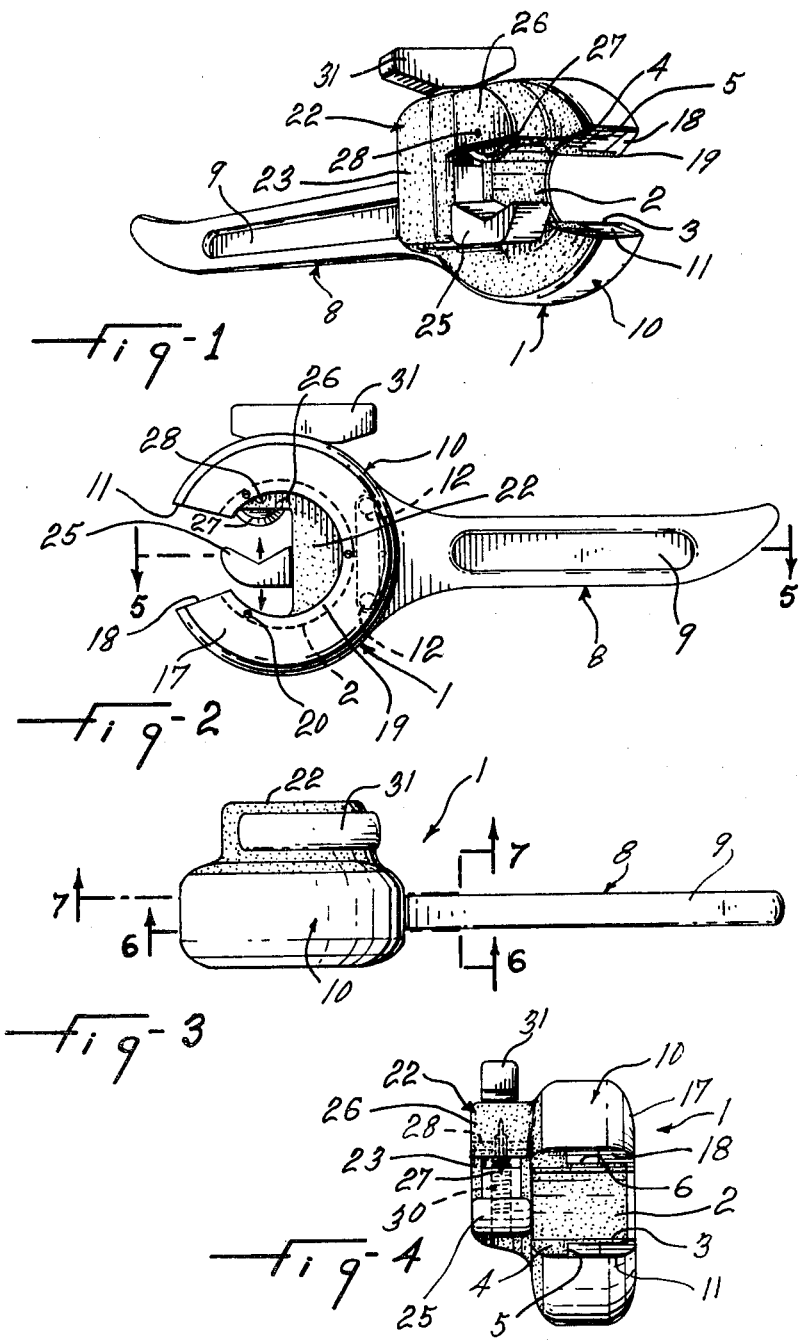

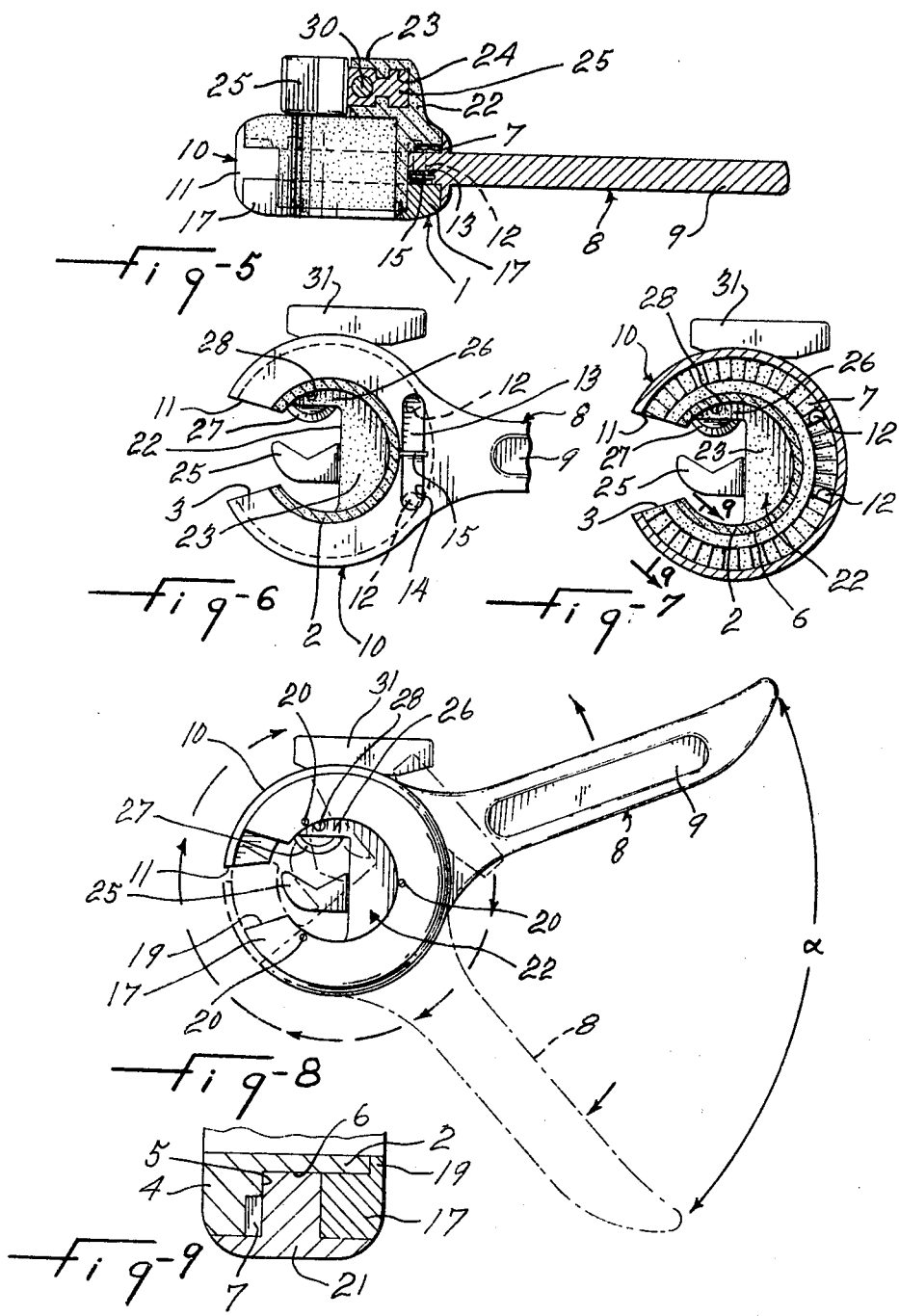

PIPE CUTTER OF THE RATCHET TYPE

The present invention relates to a pipe cutter with a ratchet handle.

BACKGROUND OF THE INVENTION

Pipe cutters with ratchet handles are known (see, for instance, U.S. Pat. No. 2,697,875 dated Dec. 28, 1954). However, in known ratchet handle pipe cutters, the tubular member carrying the cutter elements together with the surrounding ring at one end of the handle are made of two hinged parts which must be open for the insertion of a pipe to be cut, and then closed over the pipe. This entails complicated structure and timeconsuming fitting of the pipe cutter over a pipe to be cut.

OBJECTS OF THE INVENTION

It is an object of the invention to overcome the above-noted disadvantage in that the pipe cutter of the invention does not require opening and closing of the tubular member and ring for insertion of the cutter around the pipe to be cut.

Another object of the invention is to provide a pipe cutter having a minimum external diameter relative to the maximum diameter of pipes handled by the cutter, so that the cutter can be used in closed quarters.

Another object of the invention is to provide a pipe cutter of the ratchet handle type, which is of simple and inexpensive construction and in which it is a simple matter to adjust the cutting means to the exact diameter of the pipe to be cut.

SUMMARY OF THE INVENTION

In accordance with the invention, there is provided a pipe cutter comprising a tubular open-ended body adapted to surround a pipe to be cut, an elongated handle having a ring member at one end rotatably mounted within a peripheral groove of the tubular body, a pawl and ratchet system between the ring member and the tubular body to enable step-by-step rotation of the tubular body in one direction through at least 360 degrees by the back-and-forth operation of the handle through a limited angle of oscillation; a cutter member and an opposite pipe abutment member carried by the body; means to adjust the spacing between these last-named members to fit pipes of different diameters, the body having a lateral opening in register with the access opening between the cutter member and the pipe abutment member, the ring member also having a lateral opening adapted to register with the lateral opening of the body in one angular position of the handle for the insertion of a pipe to be cut within the tubular body and between the cutter member and the pipe abutment member.

SHORT DESCRIPTION OF THE DRAWINGS

In the annexed drawings:
FIG. 1 is a perspective view of the pipe cutter of the invention;
FIG. 2 is a side elevation;
FIG. 3 is a top plan view with respect to FIG. 2;
FIG. 4 is an end view taken from the left-hand side of FIG. 2;
FIG. 5 is a longitudinal section, taken along line 5—5 of FIG. 2;
FIG. 6 is a partial section, taken along line 6—6 of FIG. 3;
FIG. 7 is a partial section, taken along line 7—7 of FIG. 3;
FIG. 8 is a side elevation similar to FIG. 2 but showing operation of the pipe cutter; and
FIG. 9 is a partial cross-section, taken along line 9—9 of FIG. 7.

In the drawings, like reference characters indicate like elements throughout.

DETAILED DESCRIPTION OF A PREFERRED EMBODIMENT

The pipe cutter, generally indicated at 1, comprises a partly tubular body 2 open at both ends along its axis and having a lateral opening 3, of sufficient width for the insertion of a pipe to be cut.

At one end, body 2 has an integral radially outwardly projecting flange 4 defining a radial surface 5 at substantially right angle to the external cylindrical surface 6 of body 2. Radial surface 5 of flange 4 is provided with a series of similarly oriented ratchet teeth 7, which are interrupted by lateral opening 3.

A ratchet handle 8 comprises an elongated portion 9 adapted to be grasped by the hand and an integral split ring portion 10 at one end. The split ring 10 defines a lateral opening 11 of the same width as lateral opening 3 of tubular body 2. Split ring 10 has an internal cylindrical surface of the same diameter as cylindrical surface 6 of tubular body 2, so as to rotate around said body, being in sliding contact therewith.

Split ring 10 carries a pair of pawl members 12 diametrically opposite lateral opening 11. These pawl members are in the form of pins which are free to move in holes made across the ring 10 and have a longer length than the thickness of said ring, so as to protrude from the face of said ring opposite ratchet teeth 7. These pawl members 12 are urged into engagement with the ratchet teeth 7 by means of a single leaf spring 13 (see FIG. 6) which is held within a cavity 14 of the ring 10 by means of a cross pin 15 overlying the center of the leaf spring. The pins, or pawl members 12, have a lateral flat to engage a corresponding flat in the through hole of the ring to prevent rotation of said pawl members about their longitudinal axis. Their operative ends are bevelled to have an overrun contact with the ratchet teeth. The distance between the pawl members is greater than the width of the lateral openings 3 and 11, so that there is always one pawl member 12 in operative engagement with the ratchet teeth 7 for the full 360-degree rotation of the handle 8 around the body 1.

The split ring 10 of the handle member 8 is removably held in position around the body 2 and against the radial surface 5 of flange 4 by means of a retainer ring 17, which is also split to define a lateral opening 18 positioned in register with the lateral opening 3 of tubular body 2. Lateral opening 18 has the same width as lateral opening 3. The retainer ring 17 has an inner shoulder 19 overlying the free end of the tubular body 2, as shown in FIG. 9, and is fixed to the latter by means of small bolts 20 (see FIG. 8). Preferably, the outer end of the tubular body 2 is provided with three or more end notches, not shown, adapted to receive mating radial ribs (not shown) formed at the inner radial surface of shoulder 19 to positively prevent rotation of the retainer ring 17 relative to the tubular body 2. The split ring 10 of the handle member preferably has a head flange 21 (see FIG. 9) overlying the outer cylindrical surfaces of the flange 4 and of the retainer ring 17 to prevent entrance of dust, or the like, on the ratchet teeth and between the sliding surfaces of the handle and tubular body.

It will be noted that the retainer ring 17 forms with the radial flange 4 a peripheral groove around body 2 to rotatably receive the split ring 10 of the elongated handle 8.

Tubular body 2 carries at its end opposite retainer ring 17, an axial extension 22 which is of generally L-shape when seen in elevation, as seen in FIGS. 6 and 8. The main leg 23 of extension 22 partially obstructs one end of the tubular body 2 and is formed with a longitudinal guideway 24 (see FIG. 5) in which is longitudinally guided a pipe abutment member in the form of a V-shape jaw 25. The cross leg 26 of extension 22 carries a cutter wheel 27 freely rotatable within a slot of the cross leg 26 and retained therein by an axis pin 28, which is parallel to the axis of tubular body 2.

The jaw 25 is movable along the main leg 23 towards and away from the cutter wheel 27 in order to accommodate pipes of different diameters. In the extended limit position of the jaw 25, the latter has its end 29 (see FIG. 8) substantially in register with the edge of the tubular body at opening 3. On the other hand, cutter wheel 27 is substantially aligned with the opposite edge of the tubular body at opening 3, so that in the limit position of the jaw, the space between the jaw and the cutter wheel is of at least of the same width and is in register with the lateral openings 3 of the tubular body, and 11 of the split ring 10 of the handle member.

A threaded bolt 30 (see FIGS. 4 and 5) is screwed within a threaded hole of the jaw 25 and is rotatable within the extension 22 but axially restrained with respect to the same. The outer end of the bolt 30 carries an operating knob 31 for moving the jaw towards and away from the cutter wheel.

It is a simple matter to use the cutter member of the invention. Knob 31 is rotated to fully open the jaw 25 and the handle 8 is rotated relative to the tubular body 2, so as to align lateral openings 3 and 11. Thus, the tool can be positioned around a pipe to be cut, the pipe simply entering through the lateral openings 3 and 11 and within the aligned space between the cutter wheel 27 and the jaw 25. Then the knob is rotated to tighten the jaw 25 against the pipe contacting the cutter wheel 25. Then the handle portion 9 is simply actuated back and forth along as limited an angle of oscillation as necessary, depending on the headroom, to rotate the tubular body 2 step by step and, consequently, the cutter wheel and the jaw around the pipe through one or more full turns to eventually cut the pipe. If necessary, the knob 33 is rotated after each turn to further press the cutter wheel within the pipe material.

What I claim is:

1. A pipe cutter comprising a partly tubular open-ended rigid body split along its full length to define a lateral opening through which a pipe can be inserted with said body rotatable around said pipe, said body having a peripheral groove interrupted by said lateral opening, one radial surface of said peripheral groove being defined by a flange integral with one end of said body and the opposite radial surface of said peripheral groove being defined by a removable retainer split ring removably secured to the opposite end of said tubular body, an elongated handle forming a split ring at one end thereof, said split ring engaged within said groove for relative rotation between said handle and tubular body, said split ring defining a lateral opening of substantially the same width as the lateral opening of said tubular body and registering with the latter opening in a predetermined angular position of the handle relative to said tubular body, a pawl and ratchet system formed between the contacting surfaces of said split ring and said groove of said tubular body with the ratchet teeth interrupted by said openings, said system including ratchet teeth formed on the radial surface of said flange and said split ring of said handle carries a pair of pawl members consisting of two pins freely extending through holes of said split ring, having a bevelled end engageable with said ratchet teeth and further including a leaf spring carried in a cavity of said split ring and pressing said pins against said ratchet teeth, said two pawl members spaced from each other a distance greater than the width of said lateral openings, whereby there is always one pawl member in contacting engagement with the ratchet teeth for the full 360-degree rotation of said handle around said body, and a pipe cutter member and an opposite pipe abutment member carried by said one end of said body and axially spaced from said split ring, one of said pipe cutter member and abutment member being mounted for radial movement relative to said body towards and away from the other of said pipe cutter member and said pipe abutment member to engage a pipe therebetween, manual means to move said radially movable member to press a pipe between said two members, said two members having a spacing therebetween in register with said lateral openings, whereby a pipe can be inserted through said registering lateral openings and between said two members, and said pipe cutter member pressed against said pipe and back-and-forth operation of said handle causes rotation of said body and cutter in one direction through at least 360 degrees to cut a pipe inserted within said body and between said cutter and pipe abutment members.

2. A pipe cutter as claimed in claim 1, wherein said pipe abutment member is in the form of a V-shape jaw, said one end of said body having an L-shape extension carrying said pipe cutter member at one end and providing a guideway in which said V-shape jaw is longitudinally movable and guided.

3. A pipe cutter as claimed in claim 2, wherein said manual means includes a bolt rotatably carried by said extension and threaded within a threaded hole of said jaw, and a knob secured to said bolt externally of said extension to rotate said bolt and move said jaw towards and away from said pipe cutter member.

4. A pipe cutter as claimed in claim 3, wherein said pipe cutter member is a cutting wheel rotatably mounted within said extension about a rotational axis parallel to that of said tubular body.

5. A pipe cutter as claimed in claim 4, wherein said jaw can take a limit position in which spacing between the same and the said cutter wheel is substantially equal to the spacing between said lateral openings and is in alignment therewith.

* * * * *